United States Patent Office 3,201,428
Patented Aug. 17, 1965

3,201,428
6-KETO-3-DESOXY-Δ¹,³,⁵⁽¹⁰⁾-ESTRATRIENES AND PROCESSES FOR THEIR PREPARATION
Albert Bowers and Otto Halpern, Mexico City, Mexico, assignors to Syntex Corporation, Panama, Panama, a corporation of Panama
No Drawing. Filed Aug. 14, 1963, Ser. No. 302,008
Claims priority, application Mexico, Apr. 29, 1963, 71,709
13 Claims. (Cl. 260—397.4)

The present invention relates to a novel process for preparing certain derivatives of cyclopentanoperhydrophenanthrene and to certain novel compounds obtained by this method.

In particular, the present invention refers to a process for preparing 6-keto-3-desoxy-Δ¹,³,⁵⁽¹⁰⁾-estratriene steroids, as well as to the novel 6-keto-3-desoxy derivatives of estrone and estradiol represented by the following formula:

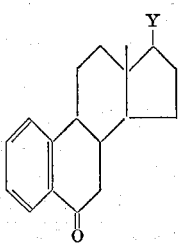

In the above formula, Y represents a ketonic group or the grouping

wherein R represents hydrogen or an acyl radical of less than 12 carbon atoms and R¹ represents hydrogen, a lower alkyl, alkenyl or alkinyl radical, such as methyl, ethyl, propyl, isobutyl, vinyl, propenyl, ethinyl, propargyl, and the like.

The acyl groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate The above novel compounds are estrogenic type hormones which exhibit anti-androgenic action and a relatively reduced feminizing effect, and are especially useful in the control of fertility.

The method for obtaining the 3-desoxy-6-keto-Δ¹,³,⁵⁽¹⁰⁾-estratrienes, which is one of the objects of the present invention, is illustrated by the following series of reaction wherein only rings A and B of the steroidal nucleus are represented:

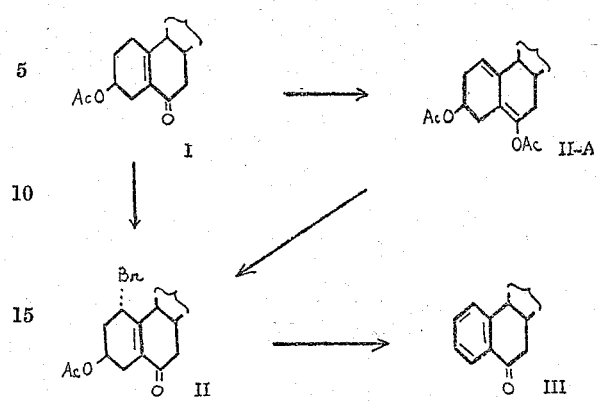

The starting compound which is a 3-acyloxy-6-keto-Δ⁵⁽¹⁰⁾-19-norsteroid of the androstane, pregnane or a sapogenin series (preferably the acetate), is obtained by oxidizing the corresponding 3-acyloxy-Δ⁵-19-hydroxy compounds with chromic acid in pyridine by the method described in our copending U.S. Patent application Serial No. 293,891, filed July 9, 1963.

Upon reacting the 3-acyloxy-6-keto-Δ⁵⁽¹⁰⁾-19-nor-steroids (I) with 1.1 equivalents of N-bromosuccinimide in carbon tetrachloride solution at reflux temperature for a time between 30 minutes and 4 hours there are obtained the corresponding 1α-bromo derivatives (II).

Upon alkaline treatment of the later, as for example with a dilute solution of potassium hydroxide in methanol, followed by reaction with a dehydrohalogenating agent, employing preferably a tertiary amine such as γ-collidine, 2,4-lutidine, quinoline, and the like, or calcium carbonate in dimethyl formamide or dimethyl acetamide at reflux temperature, there are effected simultaneously the dehydrobromination and dehydration, thus being obtained the Δ¹,³,⁵⁽¹⁰⁾-6-keto-estratrienes (III).

The 1α-bromo intermediates may be obtained alternatively by first converting the 3-acyloxy-Δ⁵⁽¹⁰⁾-6-keto compounds (I) into the enol acetates, employing conventional methods, for example by reaction with acetic anhydride or isopropenyl acetate in the presence of p-toluenesulfonic acid, thus being obtained the Δ¹⁽¹⁰⁾,⁵-3,6-diacyloxy or 3,6,17-triacyloxy compounds (IIA).

When the starting materials have other ketonic groups in different positions of the steroid molecule in addition to the keto group, at C-6, as for example at C-17 or C-20, it is necessary to protect them previously by forming a cycloethylenedioxy derivative. When the starting materials have a dihydroxy acetone side chain, this side chain is protected by formation of the bismethylenedioxy derivative.

Upon bromination of the enol acetates (II-A) with a N-bromoamide or N-bromoimide, such as N-bromoacetamide or N-bromosuccinimide, in a solvent inert to the reaction, at low temperature and preferably in the presence of sodium acetate, there are also obtained the 1α-bromo-6-keto-Δ⁵⁽¹⁰⁾-19-nor-steroids (II).

The bromination may also be effected by employing a solution of bromine in carbon tetrachloride-tetrahydrofuran mixture, and in the presence of sodium acetate.

As examples of starting materials for the process object of the present invention there are the diacetate of $\Delta^{5(10)}$-19-nor-androstene-3β,17β-diol-6-one; the acetate of 17-ethylenedioxy-$\Delta^{5(10)}$-19-nor-androsten-3β-ol-6-one; the 3-acetate of 17α-methyl-$\Delta^{5(10)}$-19-nor-androstene-3β,17β-diol-6-one; the 3-acetate of 17α-vinyl-$\Delta^{5(10)}$ - 19-nor-androstene-3β,17β-diol-6-one; the 3-acetate of 17α-ethinyl-$\Delta^{5(10)}$-19-nor-androstene-3β,17β-diol-6-one; the 3-acetate of $\Delta^{5,(10)}$-19-nor-pregnen-3β-ol-6,20-dine; the 3 acetate of 20-ethylenedioxy-$\Delta^{5(10)}$-19 - nor-pregnen-3β-ol-6-one; the 3-acetate of 16α-methyl-$\Delta^{5(10)}$-19-nor-pregnen-3β-ol-6, 20-dione; the 17,20;20,21-bismethylenedioxy-$\Delta^{5(10)}$-19-nor-pregnen-3β-ol-6-one and other similar compounds.

The method for obtaining $\Delta^{1,3,5(10)}$-estratriene-6,17-dione, $\Delta^{1,3,5(10)}$-estratriene-17β-ol-6-one as well as their 17α-substituted derivatives is illustrated by the following series of reactions:

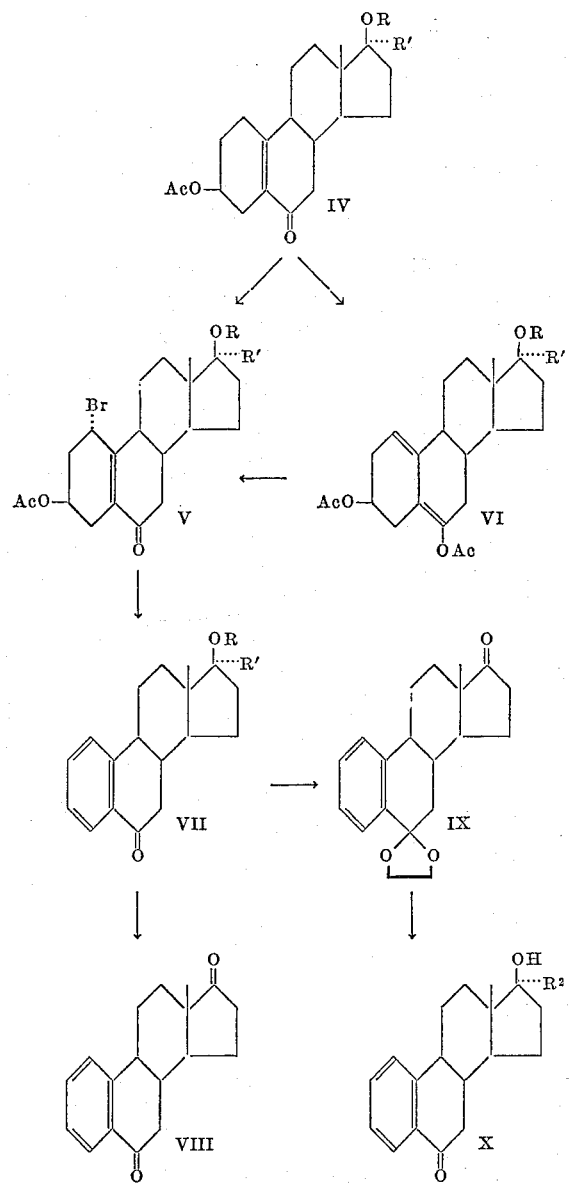

In the above formulae R and $R^1$ have the meaning indicated previously; and $R^2$ represents a lower alkyl, alkenyl or alkinyl radical.

In practicing the process outlined above, the 3,17-diacetate of $\Delta^{5(10)}$-19-nor-androstene-3β,17β-diol-6-one or 3-monoacetate of a 17α-alkyl, alkenyl or alkinyl substituted derivative (IV), is reacted with approximately 1 molar equivalent of N-bromosuccinimide in carbon tetrachloride solution, at reflux temperature for a period of time comprising between 30 minutes and 4 hours to yield the corresponding 1α-bromo derivatives (V).

The bromo compounds may also be obtained in two steps, by treating the starting materials with acetic anhydride in the presence of p-toluenesulfonic acid or acetyl chloride or isopropenyl acetate in the presence of p-toluenesulfonic acid, or by any other method known to those skilled in the art for the formation of enol acetates. By bromination of the 3,6,17-triacyloxy-$\Delta^{1(10)5}$-androstadienes thus obtained (VI), there are obtained the 3,17-diacyloxy-1α-bromo-6 - keto-$\Delta^{5(10)}$-19 - nor-androstenes (V; R=acetyl).

By alkaline treatment of the above 1α-bromo compounds, as for example by refluxing with potassium hydroxide in methanol, at reflux temperature, followed by dehydrobromination preferably with a tertiary amine such as γ-collidine, 2,4-lutidine, quinoline, or with calcium carbonate in dimethylformamide or dimethylacetamide with simultaneous dehydration, there are obtained the $\Delta^{1,3,5,(10)}$-6-keto-estratrienes (VII; R=H).

By reacting $\Delta^{1,3,5(10)}$-estratrien-17β-ol-6-one with anhydrides or chlorides of acids of less than 12 carbon atoms in pyridine solution, in a conventional manner, there are obtained the esters (VII; R=acyl, $R^1$=H).

The esters of the 17α-substituted derivatives (VII; R=acyl, $R^1$=alkyl, alkenyl, alkinyl) are obtained by reaction with anhydrides of acid of the type mentioned above in benzene solution and in the presence of p-toluenesulfonic acid.

By oxidation of $\Delta^{1,3,5,(10)}$-estratrien-17β-ol-6-one with chromic acid in aqueous acetic acid solution or 8N chromic acid in acetone there is obtained $\Delta^{1,3,5(10)}$-estratriene-6,17-dione (VIII).

The 17α-substituted compounds (X) may also be obtained starting with $\Delta^{1,3,5(10)}$-estratrien-17β-ol-6-one (VII; R and $R^1$=H) which is converted into the ethylenedioxy derivative by reaction with 2-methyl-2-ethyl-1,3-dioxolane or ethylene glycol in the presence of p-toluenesulfonic acid, and the ketal thus obtained is oxidized under alkaline conditions, preferably with chromic acid in pyridine; the 6-ethylenedioxy-$\Delta^{1,3,5(10)}$-estratrien-17-one (IX) thus obtained is treated with a Grignard reagent or with an alkyl lithium followed by acid treatment in order to hydrolyze the ethylenedioxy group at C-6.

The following specific examples serve to illustrate, but are not intended to limit the scope of the present invention:

PREPARATION 1

A mixture of 5 g. of 3-acetate of $\Delta^5$-androstene-3β,19-diol-17-one, 75 cc. of 2-methyl-2-ethyl-1,3-dioxolane and 200 mg. of p-toluenesulfonic acid was heated to boiling and refluxed with distillation for 1 hour. The mixture was cooled, diluted with water, extracted with ethyl acetate and the organic extract washed to neutral, dried and evaporated to dryness. Crystallization for acetone-hexane yielded 3-acetoxy-17-ethylenedioxy-$\Delta^5$-androsten-19-ol.

A solution of 5 g. of the above compound, in 60 cc. of pyridine was added to a mixture of 5 g. of chromic trioxide in 60 cc. of pyridine. The reaction mixture was kept at room temperature for 1 week. It was then diluted with ethyl acetate, filtered through celite and the filtrate washed well with water, dried and evaporated to dryness. Crystallization from acetone-hexane afforded 3-acetoxy-17-ethylenedioxy-$\Delta^{5(10)}$-19-nor-androsten-6-one.

In the same manner from the 3-monoacetate of $\Delta^5$-pregnen-3β-19-diol-20-one there were successively obtained 3-acetoxy-20-ethylenedioxy-$\Delta^5$-pregnen-19-ol and 3-acetoxy-20-ethylenedioxy-$\Delta^{5(10)}$-19 nor-pregnen-6-one.

Example I

A solution of 5 g. of the diacetate of $\Delta^{5(10)}$-19-nor-androstene-3β,17β-diol-6-one in 20 cc. of anhydrous carbon tetrachloride was refluxed with 2.6 g. (1.1 equivalents of N-bromosuccinimide during 2 hours). The mixture was filtered to eliminate the succinimide that was formed during the reaction and the filtrate was washed with water, dried over anhydrous sodium sulfate and evaporated to dryness under reduced pressure. Recrystallization of the residue from methylene chloride-hexane gave the diacetate of 1α-bromo-Δ$^{5(10)}$-19-nor-androstene-3β,17β-diol-6-one.

In the same manner the compounds mentioned below (I) were converted into the corresponding 1α-bromo derivatives II:

| I | II |
|---|---|
| 3-acetate of 17α-methyl-Δ$^{5(10)}$-19-nor-androstene-3β,17β-diol-6-one | 3-acetate of 1α-bromo-17α-methyl-Δ$^{5(10)}$-19-nor-androstene-3β,17β-diol-6-one. |
| 3-acetate of 17α-vinyl-Δ$^{5(10)}$-19-nor-androstene-3β,17β-diol-6-one | 3-acetate of 1α-bromo-17α-vinyl-Δ$^{5(10)}$-19-nor-androstene-3β,17β-diol-6-one. |
| 3-acetate of 17α-ethinyl-Δ$^{5(10)}$-19-nor-androstene-3β,17β-diol-6-one | 3-acetate of 1α-bromo-17α-ethinyl-Δ$^{5(10)}$-19-nor-androstene-3β,17β-diol-6-one. |
| Acetate of Δ$^{5(10)}$-19-nor-androsten-3β-ol-6,17-dione | Acetate of 1α-bromo-Δ$^{5(10)}$-19-nor-androsten-3β-ol-6,17-dione. |
| Acetate of Δ$^{5(10)}$-19-nor-pregnen-3β-ol-6,20-dione | Acetate of 1α-bromo-Δ$^{5(10)}$-19-nor-pregnen-3β-ol-6,20-dione. |
| Acetate of 16α-methyl-Δ$^{5(10)}$-19-nor-pregnen-3β-ol-6,20-dione | Acetate of 1α-bromo-16α-methyl-Δ$^{5(10)}$-19-nor-pregnen-3β-ol-6,20-dione. |
| Acetate of 16α,17α-isopropylidenedioxy-Δ$^{5(10)}$-19-nor-pregnen-3β-ol-6,20-dione | Acetate of 1α-bromo-16α,17α-isopropylidenedioxy-Δ$^{5(10)}$-19-nor-pregnen-3β-ol-6,20-dione. |
| Diacetate of Δ$^{5(10)}$-19-nor-pregnene-3β,17α-diol-6,20-dione | Diacetate of 1α-bromo-Δ$^{5(10)}$-19-nor-pregnene-3β,17α-diol-6,20-dione. |
| Acetate of 17,20; 20,21-bismethylenedioxy-Δ$^{5(10)}$-19-nor-pregnen-3β-ol-6-one | Acetate of 1α-bromo-17,20; 20,21-bismethylenedioxy-Δ$^{5(10)}$-19-nor-pregnen-3β-ol-6-one. |
| Acetate of 17,20; 20,21-bismethylenedioxy-Δ$^{5(10)}$-19-nor-pregnen-3β-ol-6,11-dione | Acetate of 1α-bromo-17,20; 20,21-bismethylenedioxy-Δ$^{5(10)}$-19-nor-pregnen-3β-ol-6,11-dione. |
| Acetate of Δ$^{5(10)}$-19-nor-22-isospirosten-3β-ol-6-one | Acetate of 1α-bromo-Δ$^{5(10)}$-19-nor-22-isospirosten-3β-ol-6-one. |

*Example II*

A mixture of 5 g. of the diacetate of Δ$^{5(10)}$-19-nor-androstene-3β,17β-diol-6-one, 50 cc. of acetic anhydride and 500 mg. of p-toluenesulfonic acid was heated to reflux with slow distillation, during 6 hours. It was poured into ice water and the mixture was stirred during 30 minutes to hydrolize the excess anhydride. It was extracted with methylene chloride and the extract was washed with sodium carbonate solution and water to neutral, dried over anhydrous sodium sulfate and evaporated to dryness, to give the 3,6,17-triacetoxy-Δ$^{1(10),5}$-19-nor-androstadiene which was used in the next step without further purification.

The above crude product was dissolved in 100 cc. of dioxane, cooled to 10° C., there were added 3 cc. of 0.5 N-perchloric acid and 2.6 g. of N-bromosuccinimide in portions over a period of 30 minutes. The mixture was stirred for a further 2 hours at room temperature, poured into water and extracted with ethyl acetate; the organic extract was washed with water, dried over anhydrous soduim sulfate and evaporated to dryness. By crystallization from acetone-ether there was obtained the 3,17-diacetate of 1α-bromo-Δ$^{5(10)}$-19-nor androstene-3β,17β-diol-6-one identical with the one obtained in the foregoing example.

*Example III*

To a mixture of 1 g. of 3,6,17-triacetoxy-Δ$^{1(10),5}$-19-nor-androstadiene, 50 cc. of acetone and 10 drops of pyridine were added 0.7 g. of sodium acetate dissolved in 7 cc. of water. The mixture was cooled to 0° C. and there were added 430 mg. of N-bromoacetamide (1.1 equivalents) suspended in 5.7 cc. of acetic acid, the mixture was stirred at 0° C. during 1 additional hour, it was poured into ice water and the formed precipitate was filtered off. There was thus obtained the 3,17-diacetate of 1α-bromo-Δ$^{5(10)}$-19-nor-androstene-3β,17β-diol-6-one, identical with the product obtained in the foregoing examples.

*Example IV*

A solution of 2 g. of 1α-bromo-Δ$^{5(10)}$-19-nor-androstene-3β,17β-diol-6-one in 70 cc. of methanol was treated with 5 cc. of an aqueous solution of 5% potassium hydroxide, the reacting mixture was refluxed during 1 hour under nitrogen atmosphere, neutralized with acetic acid and the methanol was distilled under reduced pressure. The residue was triturated with water, the solid was filtered off, washed with water and dried.

The total above product was heated to reflux during 30 minutes with 10 cc. of γ-collidine, under nitrogen atmosphere, the solution was cooled, the precipitate filtered and the filtrate was diluted with ether, washed with dilute hydrochloric acid, sodium bicarbonate solution and water, dried and evaporated to dryness. The residue was recrystallized from ether hexane thus producing Δ$^{1,3,5(10)}$-estratrien-17β-ol-6-one.

*Example V*

A solution of 1 g. of Δ$^{1,3,5(10)}$-estratrien-17β-ol-6-one in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording Δ$^{1,3,5(10)}$-estratriene-6,17-dione.

*Example VI*

In accordance with the method described in Example III, the 1α-bromo compounds mentioned below (I), were treated with a solution of potassium hydroxide in methanol followed by reaction with collidine thus being obtained the corresponding Δ$^{1,3,5(10)}$-estratrienes.

| I | II |
|---|---|
| 3-acetate of 1α-bromo-17α-methyl-Δ$^{5(10)}$-19-norandrostene-3β,17β-diol-6-one | 17α-methyl-Δ$^{1,3,5(10)}$-estratrien-17β-ol-6-one. |
| 3-acetate of 1α-bromo-17α-vinyl-Δ$^{5(10)}$-19-norandrostene-3β,17β-diol-3-one | 17α-vinyl-Δ$^{1,3,5(10)}$-estratrien-17β-ol-6-one. |
| 3-acetate of 1α-bromo-17α-ethinyl-Δ$^{5(10)}$-19-norandrostene-3β,17β-diol-6-one | 17α-ethinyl-Δ$^{1,3,5(10)}$-estratrien-17β-ol-6-one. |
| Acetate of 1α-bromo-Δ$^{5(10)}$-19-nor-androsten-3β-ol-6,17-dione | Δ$^{1,3,5(10)}$-estratriene-6,17-dione. |
| Acetate of 1α-bromo-Δ$^{5(10)}$-19-nor-pregnen-3β-ol-6,20-dione | Δ$^{1,3,5(10)}$-19-nor-pregnatriene-6,20-dione. |
| Acetate of 16α-methyl-1α-bromo-Δ$^{5(10)}$-19-nor-pregnen-3β-ol-6,20-dione | 16α-methyl-Δ$^{1,3,5(10)}$-19-nor-pregnatriene-6,20-dione. |
| Acetate of 16α,17α-isopropylidenedioxy-1α-bromo-Δ$^{5(10)}$-19-nor-pregnen-3β-ol-6,20-dione | 16α,17α-isopropylidenedioxy-Δ$^{1,3,5(10)}$-19-nor-pregnatriene-6,20-dione. |

*Example VII*

In the method of Example III there was substituted γ-collidine by 2,4-lutidine, furnishing also Δ$^{1,3,5(10)}$-estratrien-17β-ol-6-one in similar yields.

*Example VIII*

A mixture of 1.5 g. of the diacetate of Δ$^{5(10)}$-19-norandrosten-3β,17β-diol-6-one, 20 cc. of isopropenyl acetate and 60 mg. of p-toluenesulfonic acid was heated to reflux with slow distillation during 8 hours and was cooled.

The above solution was diluted with ethyl acetate, washed with water, aqueous sodium bicarbonate solution and then with water to neutral, was dried over anhydrous sodium sulfate and evaporated to dryness under reduced pressure, to give 3,6,17-triacetoxy-Δ$^{1(10),5}$-19-nor - androstadiene identical to the one obtained by the method of Example II.

In the same manner, starting with 3-acetoxy-17-ethyl-enedioxy-$\Delta^{5(10)}$-19-nor-androsten-6-one and with 3 - acetoxy-20-ethylenedioxy-$\Delta^{5(10)}$-19-nor-pregnen-6 - one there were respectively obtained 3,6-diacetoxy-17-ethylenedioxy-$\Delta^{1(10),5}$-19-nor-androstadiene and 3,6-diacetoxy-20 - ethylenedioxy-$\Delta^{1(10),5}$-19-nor-pregnadiene.

*Example IX*

A solution of 1 g. of the diacetate of 1α-bromo-$\Delta^{5(10)}$-19-nor-androsten-3β,17β-diol-6-one in 50 cc. of methanol was refluxed for 45 minutes under nitrogen atmosphere with 500 mg. of potassium hydroxide dissolved in 1 cc. of water. It was cooled, diluted with water, filtered and the formed precipitate was dried in vacuo. The total above product dissolved in 10 cc. of cold dimethylformamide was added to a boiling suspension of 5 g. of finely divided calcium carbonate in 10 cc. of dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. The residue was crystallized from acetone-hexane, to give $\Delta^{1,3,5(10)}$-estratrien-17β-ol-6-one, identical with the product obtained in Example IV.

*Example X*

A solution of 5 g. of 3-acetoxy-17-ethylenedioxy-$\Delta^{5(10)}$-19-nor-androsten-6-one in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 3,6-diacetoxy-17-ethylenedioxy-$\Delta^{1(10),5}$-19-nor-androstadiene, identical with the one obtained by the method of Example VIII, which by reaction with N-bromoacetamide in acetone solution, according to the method described in Example III, produced the 1α-bromo-3-acetoxy-17-ethylenedioxy-6-one.

The above compound was submitted to the reactions described in the foregoing example, i.e. treatment with potassium hydroxide in methanol followed by the reaction with calcium carbonate in dimethyl formamide.

The total product of the dehydrobromination was dissolved in 150 cc. of acetone, there were added 500 mg. of p-toluenesulfonic acid and the reaction mixture was kept at room temperature overnight was poured into water and extracted with ethyl acetate.

The organic extract was washed with water, 5% sodium carbonate solution and water to neutral, dried over anhydrous sodium sulfate, and evaporated to dryness under reduced pressure. The residue was crystallized from acetone-ether to give $\Delta^{1,3,5(10)}$-estratriene-6,17-dione identical with the one obtained in Example V.

In the same manner, starting with 3,6-diacetoxy-20-ethylenedioxy-$\Delta^{1(10),5}$-19-nor-pregnadiene there was obtained as final product $\Delta^{1,3,5(10)}$-19-nor-pregnatriene-6,20-dione identical to that obtained in Example VI.

*Example XI*

In the method of Example IX, there was substituted dimethyl formamide by dimethyl acetamide, producing also $\Delta^{1,3,5(10)}$-estratrien-17β-ol-6-one in similar yield.

*Example XII*

To a stirred solution of 1 g. of 3,6,17-triacetoxy-$\Delta^{1(10),5}$-19-nor-androstadiene in 75 cc. of carbon tetrachloride and 75 cc. of anhydrous tetrahydrofuran were added 4 g. of anhydrous sodium acetate and 500 mg. of bromine in 5 cc. of carbon tetrachloride, and the mixture was stirred for 20 minutes further. There was then added an excess of sodium bisulfite solution, the organic layer was separated and washed repeatedly with water, dried over anhydrous sodium sulfate and evaporated to dryness under reduced pressure. By crystallization of the residue from acetone-ether there was obtained the diacetate of 1α-bromo-$\Delta^{5(10)}$-19-nor-androstene-3β,17β-diol-6-one, identical with the one obtained in the above examples.

*Example XIII*

Following the technique described in Example IX, the 1α-bromo compounds mentioned below (I), were refluxed with a solution of potassium hydroxide in methanol and then with calcium carbonate in dimethyl formamide thus being obtained the products under II.

| I | II |
|---|---|
| Diacetate of 1α-bromo-$\Delta^{5(10)}$-19-nor-pregnene-3β,17α-diol-6,20-dione. | $\Delta^{1,3,5(10)}$-19-nor-pregnatrien-17α-ol-6,20-dione. |
| Acetate of 1α-bromo-17,20;20,21-bismethylene-dioxy-$\Delta^{5(10)}$-19-nor-pregnen-3β-ol-6-one. | 17,20;20,21-bismethylenedioxy-$\Delta^{1,3,5(10)}$-19-nor-pregnatrien-6-one. |
| Acetate of 1α-bromo-17,20;20,21-bismethylene-dioxy-$\Delta^{5(10)}$-19-nor-pregnen-3β-ol-6,11-dione. | 17,20;20,21-bismethylenedioxy-$\Delta^{1,3,5(10)}$-19-nor-pregnatriene-6,11-dione. |
| Acetate of 1α-bromo-$\Delta^{5(10)}$-19-nor-22-isospirosten-3β-ol-6-one. | $\Delta^{1,3,5(10)}$-19-nor-22-isospirosten-6-one. |

*Example XIV*

According to the method described in Preparation 1, 10 g. of $\Delta^{1,3,5(10)}$-estratrien-17β-ol-6-one were treated with 2-methyl-2-ethyl-1,3-dioxolane in the presence of p-toluenesulfonic acid and the obtained 6-ethylenedioxy-$\Delta^{1,3,5(10)}$-estratrien-17β-ol was oxidized with chromium trioxide in pyridine, to give 6-ethylenedioxy-$\Delta^{1,3,5(10)}$-estratrien-17-one.

A solution of 5 g. of the above compound in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

The oily residue thus obtained was dissolved in 150 cc. of acetone, 500 mg. of p-toluenesulfonic acid were added and the mixture was kept at ambient temperature during 4 hours, it was poured into water, extracted with methylene-chloride and the extract was washed to neutral, dried and evaporated to dryness. By chromatography of the residue on 250 g. of washed alumina there was obtained 17α-methyl-$\Delta^{1,3,5(10)}$-estratrien-17β-ol-6-one identical with the one obtained in Example VI.

*Example XV*

Following the method described in the foregoing example but employing ethyl, propyl, propargyl and propenyl magnesium bromide instead of methyl magnesium bromide there were obtained from 6-ethylenedioxy-$\Delta^{1,3,5(10)}$-estratrien-17-one: 17α-ethyl-$\Delta^{1,3,5(10)}$-estratrien - 17β-ol-6-one, 17α-propyl-$\Delta^{1,3,5(10)}$-estratrien-17β-ol-6-one, 17α-propargyl-$\Delta^{1,3,5(10)}$-estratrien-17β-ol-6-one and 17α-propenyl-$\Delta^{1,3,5(10)}$-estratrien-17β-ol-6-one.

Example XVI

To a stirred suspension of 6-ethylenedioxy-$\Delta^{1,3,5(10)}$-estratrien-17-one in 30 cc. of anhydrous ether was added a solution of butyl lithium, previously prepared from 11.5 cc. of 1-bromo butane and 0.67 g. of lithium in 60 cc. of ether, the mixture was stirred during 24 hours under nitrogen atmosphere, water was added and it was acidified with hydrochloric acid, stirring for 1 hour further, the ether layer was separated and washed with water to neutral, dried over anhydrous sodium sulfate and evaporated to dryness in vacuo. By chromatography of the residue there was obtained 17α-butyl-$\Delta^{1,3,5(10)}$-estratrien-17β-ol-6-one.

A mixture of 1 g. of $\Delta^{1,3,5(10)}$-estratrien-17β-ol-6-one, 4 cc. of pyridine and 4 cc. of acetic anhydride was kept at room temperature overnight, poured into ice water, and the formed precipitate was filtered, washed with water and dried. Crystallization from acetone-hexane gave the acetate of $\Delta^{1,3,5(10)}$-estratrien-17β-ol-6-one.

In the same manner, but employing propionic, caproic cyclopentylpropionic and enanthic anhydride as esterifying agents there were obtained the propionate caproate cyclopentylpropionate and enanthate of $\Delta^{1,3,5(10)}$-estratrien-17β-ol-6-one.

Example XVII

To a solution of 1 g. of 17α-methyl-$\Delta^{1,3,5,(10)}$-estratrien-17β-ol-6-one in 40 cc. of anhydrous benzene there were added 200 mg. of p-toluenesulfonic acid and 4 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 17α-methyl-$\Delta^{1,3,5(10)}$-estratrien-17β-ol-6-one.

In the same manner 17α-ethyl-$\Delta^{1,3,5(10)}$-estratrien-17β-ol-6-one, 17α-vinyl-$\Delta^{1,3,5(10)}$-estratrien-17β-ol-6-one and 17α-ethinyl-$\Delta^{1,3,5(10)}$-estratrien-17β-ol-6-one were converted into the corresponding acetates.

Example XVIII

Following the method described in the foregoing example, the compounds mentioned below (I) were esterified with the indicated acid anhydrides, to give the corresponding esters II:

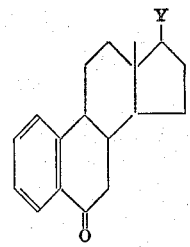

wherein Y is selected from the group consisting of a keto group and the grouping

wherein R is selected from the group consisting of hydrogen and a hydrocarbon carboxylic acyl radical of less than 12 carbon atoms; and $R^1$ is selected from the group consisting of hydrogen, lower alkyl, lower alkenyl and lower alkinyl.

2. $\Delta^{1,3,5(10)}$-estratrien-17β-ol-6-one.
3. 17α-methyl-$\Delta^{1,3,5(10)}$-estratrien-17β-ol-6-one.
4. 17α-ethyl-$\Delta^{1,3,5(10)}$-estratrien-17β-ol-6-one.
5. 17α-propyl-$\Delta^{1,3,5(10)}$-estratrien-17β-ol-6-one.
6. 17α-butyl-$\Delta^{1,3,5(10)}$-estratrien-17β-ol-6-one.
7. 17α-vinyl-$\Delta^{1,3,5(10)}$-estratrien-17β-ol-6-one.
8. 17α-propenyl-$\Delta^{1,2,5(10)}$-estratrien-17β-ol-6-one.
9. 17α-ethinyl-$\Delta^{1,3,5(10)}$-estratrien-17β-ol-6-one.
10. 17α-propargyl-$\Delta^{1,3,5(10)}$-estratrien-17β-ol-6-one.

11. A process for preparing 6-keto-$\Delta^{1,3,5(10)}$-19-nor steroids selected from the group consisting of the androstane, pregnane and sapogenin series, which comprises treating the corresponding 3-acyloxy-6-keto-$\Delta^{5(10)}$-19-nor steroid with N-bromo succinimide and reacting the obtained 1α-bromo derivative with an alkaline medium followed by treatment with tertiary amine.

12. The process of claim 11 wherein the alkaline medium is potassium hydroxide in methanol and the tertiary amine is γ-collidine.

13. A process for the production of 6-keto-$\Delta^{1,3,5(10)}$-19-nor-steroids selected from the group consisting of the androstane, pregnane and sapogenin series, which comprises treating the corresponding 3-acyloxy-6-keto-$\Delta^{5(10)}$-19-nor steroid in the presence of p-toluenesulfonic acid with a reagent selected from the group consisting of acetic anhydride, acetyl chloride and isopropenyl acetate, reacting the thus obtained enol acetate with a reagent selected from the group consisting of N-bromo acetamide, N-bromo succinimide and bromine, and treating the produced 1α-bromo compound with an alkaline medium followed by reaction with a tertiary amine.

| I | Anhydride | II |
|---|---|---|
| 17α-methyl-$\Delta^{1,3,5(10)}$-estratrien-17β-ol-6-one | Caproic | Caproate of 17α-methyl-$\Delta^{1,3,5(10)}$-estratrien-17β-ol-6-one. |
| 17α-ethyl-$\Delta^{1,3,5(10)}$-estratrien-17β-ol-6-one | Propionic | Propionate of 17α-ethyl-$\Delta^{1,3,5(10)}$-estratrien-17β-ol-6-one. |
| 17α-propyl-$\Delta^{1,3,5(10)}$-estratrien-17β-ol-6-one | Undecenoic | Undecenoate of 17α-propyl-$\Delta^{1,3,5(10)}$-estratrien-17β-ol-6-one. |
| 17α-butyl-$\Delta^{1,3,5(10)}$-estratrien-17β-ol-6-one | Enanthic | Enanthate of 17α-butyl-$\Delta^{1,3,5(10)}$-estratrien-17β-ol-6-one. |
| 17α-vinyl-$\Delta^{1,3,5(10)}$-estratrien-17β-ol-6-one | Propionic | Propionate of 17α-vinyl-$\Delta^{1,3,5(10)}$-estratrien-17β-ol-6-one. |
| 17α-propenyl-$\Delta^{1,3,5(10)}$-estratrien-17β-ol-6-one | Caproic | Caproate of 17α-propenyl-$\Delta^{1,3,5(10)}$-estratrien-17β-ol-6-one. |
| 17α-ethinyl-$\Delta^{1,3,5(10)}$-estratrien-17β-ol-6-one | Cyclopentyl-propionic | Cyclopentylpropionate of 17α-ethinyl-$\Delta^{1,3,5(10)}$-estratrien-17β-ol-6-one. |
| 17α-propargyl-$\Delta^{1,3,5(10)}$-estratrien-17β-ol-6-one | Undecenoic | Undecenoate of 17α-propargyl-$\Delta^{1,3,5(10)}$-estratrien-17β-ol-6-one. |

We claim:
1. A compound of the following formula:

No references cited.

LEWIS GOTTS, *Primary Examiner.*